US010752366B2

(12) United States Patent
Fernandez-Lopez et al.

(10) Patent No.: US 10,752,366 B2
(45) Date of Patent: Aug. 25, 2020

(54) AIRCRAFT WITH A BLEED AIR HEATING SYSTEM FOR APU COMPARTMENT

(71) Applicant: AIRBUS OPERATIONS, S.L., Getafe (ES)

(72) Inventors: Pio Fernandez-Lopez, Getafe (ES); Pedro Felipe Ramos Paul Lastra, Getafe (ES); Cristina Sañudo Obregon, Getafe (ES); Maria Zamarro Martin, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 260 days.

(21) Appl. No.: 15/995,439

(22) Filed: Jun. 1, 2018

(65) Prior Publication Data

US 2018/0346131 A1 Dec. 6, 2018

(30) Foreign Application Priority Data

Jun. 2, 2017 (EP) ..................... 17382329

(51) Int. Cl.
*B64D 13/08* (2006.01)
*B64D 41/00* (2006.01)
B64D 13/06 (2006.01)

(52) U.S. Cl.
CPC ............ *B64D 13/08* (2013.01); *B64D 41/00* (2013.01); *B64D 2013/0611* (2013.01); *B64D 2013/0618* (2013.01)

(58) Field of Classification Search
CPC .................... B64D 13/08; B64D 41/00; B64D 2013/0611; B64D 2013/0618
See application file for complete search history.

(56) References Cited

U.S. PATENT DOCUMENTS

| 9,789,967 | B2 * | 10/2017 | Shea | B64D 13/06 |
| 2014/0305130 | A1 * | 10/2014 | Shepard | B64D 41/00 60/773 |

(Continued)

FOREIGN PATENT DOCUMENTS

| EP | 3127814 | 2/2017 |
| FR | 3013683 | 5/2015 |

OTHER PUBLICATIONS

European Search Report, dated Nov. 3, 2017, priority document.

*Primary Examiner* — Valentina Xavier
(74) *Attorney, Agent, or Firm* — Greer, Burns & Crain, Ltd.

(57) ABSTRACT

An aircraft comprising a main engine to provide a supply of bleed air, an APU housing within an APU compartment and having an APU bleed valve, an APU bleed air duct connecting main engine with the APU, and a bleed air heating system for the APU compartment comprising an auxiliary pipeline connecting the APU bleed air duct with the APU compartment, a temperature sensor, an auxiliary pipeline valve to control the discharge of bleed air into the APU compartment, and a temperature controller configured to establish a heating operation mode, when the sensed temperature falls below a minimum temperature threshold value, and a standby operation mode, when the sensed temperature surpasses a maximum temperature threshold value. The temperature controller operates the main engine and the valves to establish these operation modes.

9 Claims, 1 Drawing Sheet

(56) References Cited

U.S. PATENT DOCUMENTS

| | | |
|---|---|---|
| 2017/0036775 A1 | 2/2017 | Jones et al. |
| 2017/0137132 A1* | 5/2017 | Wiegers ................. B64D 13/06 |
| 2017/0166320 A1 | 6/2017 | Rideau et al. |

* cited by examiner

AIRCRAFT WITH A BLEED AIR HEATING SYSTEM FOR APU COMPARTMENT

CROSS-REFERENCES TO RELATED APPLICATIONS

This application claims the benefit of the European patent application No. 17382329.5 filed on Jun. 2, 2017, the entire disclosures of which are incorporated herein by way of reference.

BACKGROUND OF THE INVENTION

The present invention refers to a bleed air heating system for an auxiliary power unit (APU) compartment of an aircraft, in order to de-ice the fuel trapped in the APU before starting and after being disconnected for a long time under freezing conditions.

The auxiliary power unit (APU) is a gas turbine engine that traditionally supplies electric and pneumatic power to the aircraft systems as an auxiliary or secondary source of power. The APU allows the aircraft to be autonomous of external electric and pneumatic power sources on ground and in-flight.

This electric and pneumatic power can be provided to the aircraft separately or in combination. The pneumatic power provides compressed air for the cabin and power for main engine starting.

FIG. 1 shows a conventional APU bleed supply architecture. As shown, the architecture comprises an APU (3) held in the APU compartment (2) provided in the tail cone of the aircraft (1), an APU bleed valve (4) configured to open and close the bleed air passage from the APU (3), and an APU bleed air duct (5) for conveying the APU bleed air towards the main engines (6).

Some bleed supply architectures further comprise an isolation valve (11) to protect the APU (3) when no compressed air is being supplied.

Under certain conditions, the aircraft's fuel system may provide fuel with a high concentration of liquid water. Once the APU is stopped, this mixture of fuel and water gets trapped inside all the fuel system cavities, conducts, valves, pumps, actuators, sensors, etc.

It frequently occurs that the APU gets exposed to water subfreezing temperatures during long periods of time, such as when aircraft is parked overnight or during cruise flight, where APU shuts off once the main engines get started.

In these cases, lumps of liquid water get solidified and cause internal fuel system blockages that impede the start and the normal running process of the APU.

It would therefore be desirable to provide technical means to an aircraft for defrosting the fuel trapped in the APU, to thus improve the starting and operation phases of the APU irrespective of the freezing conditions.

SUMMARY OF THE INVENTION

The present invention overcomes the above-mentioned drawbacks by providing an aircraft with a bleed air heating system for the APU compartment that heats the overall APU compartment, to defrost the mixture of fuel and water trapped in the APU. Additionally, the invention provides a simple solution that maximizes the reuse of conventional components of the APU bleed air supply.

An object of the invention is to provide an aircraft with a bleed air heating system that is capable of defrosting the fuel contained in the APU, to offer a quick startup and operation of the APU when necessary.

Another object of the present invention is to provide an aircraft with a bleed air heating system that maximizes commonality and reuses of pneumatic system components in existing aircraft.

The invention refers to an aircraft comprising a main engine capable of providing a supply of bleed air, an auxiliary power unit housed within an APU compartment and having an APU bleed valve configured to control the bleed air passage into the auxiliary power unit, an APU bleed air duct connecting the main engine with the auxiliary power unit to provide a bleed air passage, and a bleed air heating system for the APU compartment, which comprises an auxiliary pipeline, an auxiliary pipeline valve, a temperature sensor, and a temperature controller.

The auxiliary pipeline is tapped to the APU bleed air duct and connected to the APU compartment. This way, the bleed air carried by the APU bleed air duct can be discharged into the APU compartment.

The auxiliary pipeline valve is configured to control the bleed air discharged from the auxiliary pipeline into the APU compartment. This way, the system can regulate the amount of bleed air discharged into the APU compartment.

The temperature sensor is placed to sense the temperature of the APU compartment. This way, the bleed air heating system allows continuous monitoring of the temperature in the APU compartment, and quickly acts when required.

The temperature controller is coupled to the temperature sensor to receive the sensed temperature, and is configured to establish a heating operation mode or a standby operation mode depending on the sensed temperature. The heating operation mode is established when the sensed temperature falls below a minimum temperature threshold value, and the standby operation mode is established when the sensed temperature surpasses a maximum temperature threshold value.

When the heating operation mode is established, the temperature controller is configured to command the closing of the APU bleed valve to prevent the bleed air from entering into the auxiliary power unit, activate the bleed air supply of the main engine, and activate the opening of the auxiliary pipeline valve for conducting bleed air from the main engine towards the APU compartment, to heat the APU compartment.

When the standby operation mode is established, the temperature controller is configured to deactivate the bleed air supply of the main engine, activate the closing of the auxiliary pipeline valve to stop heating the APU compartment, and command the opening of the APU bleed valve to allow the bleed air enter into the auxiliary power unit.

The temperature controller is thus configured to operate the system in two modes of operation, the heating operation mode in which bleed air of the main engine is used for heating the overall APU compartment, and the standby operation mode in which bleed air is no longer required because the APU compartment is above the maximum temperature threshold value.

The temperature controller allows maintaining the temperature of the APU compartment within a safety margin. The invention thus provides a safe defrost without risk of overheating of the APU or even a fire.

The bleed air heating system is integrated in conventional pneumatic architectures, reusing components, and offering a more efficient architecture.

The invention thus improves the aircraft performance by enabling a quick start of the APU when it has to be restarted after being shut down under water subfreezing temperatures. This start is mainly required when the aircraft is parked, and also before landing, when APU is required to feed the systems and provide cabin conditioned air during disembarkation.

BRIEF DESCRIPTION OF THE DRAWINGS

For a better comprehension of the invention, the following drawings are provided for illustrative and non-limiting purposes, wherein.

DETAILED DESCRIPTION OF THE PREFERRED EMBODIMENTS

Figure 1:
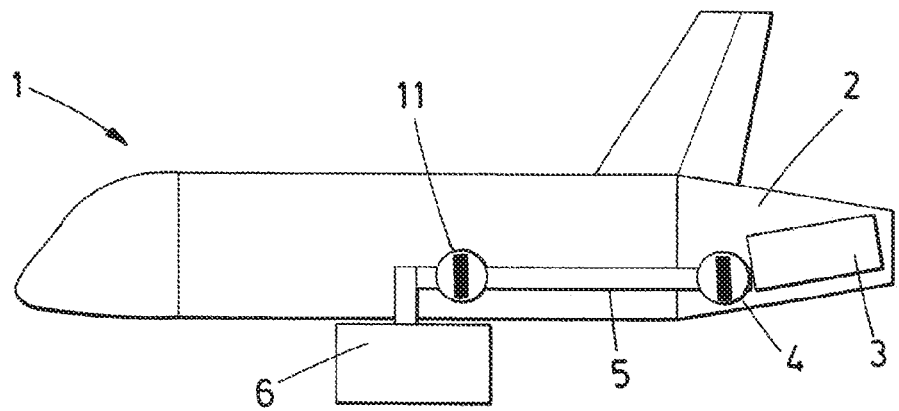
FIG. 1 shows a schematic view of an aircraft with a conventional pneumatic system, in which the APU provides a bleed air supply.
Figure 2:
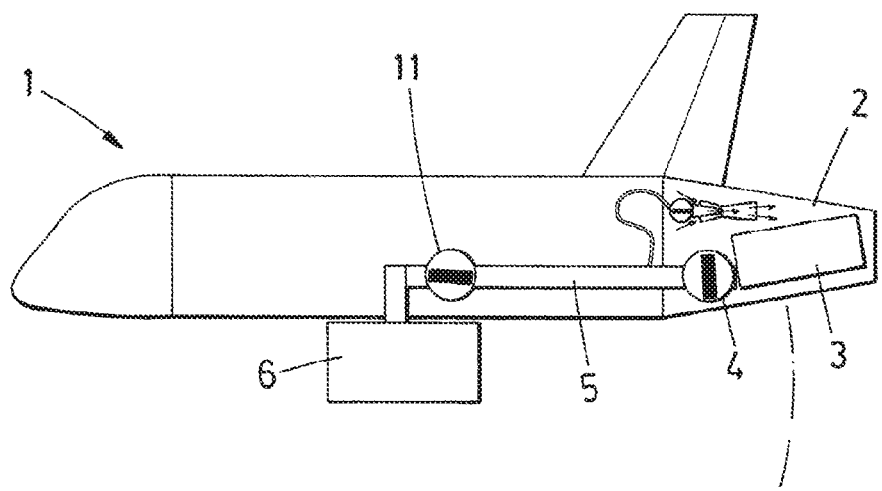
FIG. 2 shows a schematic and detailed view of an aircraft equipped with a bleed air heating system, according to an embodiment of the present invention.
Figure 2:
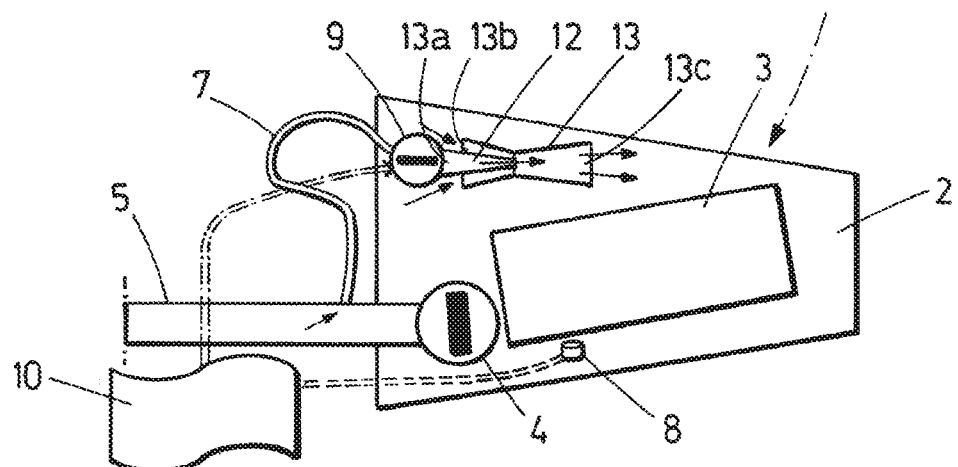

FIG. 2 shows a schematic and detailed view of an aircraft 1 that comprises at least one main engine 6 configured to provide a supply of bleed air and preferentially installed at the central section of the aircraft 1, and an APU 3 housed within an APU compartment 2 installed at the tail cone of the aircraft 1.

An APU bleed air duct 5 is disposed to connect the main engine 6 with the APU 3 for providing bleed air passage. The APU bleed air duct 5 is traditionally used for conducting APU bleed air to the main engines. However, the invention contemplates the use of this duct 5 for carrying the air in reverse flow, that is, from the main engine 6 towards the APU 3 when the APU compartment 2 needs to be heated.

The APU 3 has an APU bleed valve 4 configured to selectively route the bleed air to the main engine 6 or back to the APU 3.

According to the invention, the aircraft further comprises a bleed air heating system for the APU compartment 2. This system comprises an auxiliary pipeline 7, an auxiliary pipeline valve 9, a temperature sensor 8, and a temperature controller 10 adapt to operate the main engine 6 and both valves 4, 9 to activate and deactivate the heating of the APU compartment 2.

The auxiliary pipeline 7 is connected between the APU bleed air duct 5 and the APU compartment 2, to allow bleed air to enter the APU compartment 2.

The auxiliary pipeline valve 9 is configured to selectively open and close the discharge of bleed air into the APU compartment 2.

The temperature sensor 8 is placed within the APU compartment 2 to sense the temperature of the compartment 2.

The temperature controller 10 is coupled with the temperature sensor 8, the main engine 6, the APU bleed valve 4 and the auxiliary pipeline valve 9 to perform safe heating of the APU compartment.

The temperature controller 10 is configured to receive the sensed temperature, and establish a heating operation mode if the sensed temperature falls below a minimum temperature threshold value, and a standby mode if the sensed temperature surpasses a maximum temperature threshold value and the APU compartment does not need to be heated.

On heating operation mode, the temperature controller is configured to command the closing of the APU bleed valve to avoid the bleed air enter into the APU, activate the bleed air supply of the main engine, and activate the opening of the auxiliary pipeline valve to conduct bleed air from the main engine towards the APU compartment, and heat it.

On standby operation mode, the temperature controller is configured to deactivate the bleed air supply of the main engine, activate the closing of the auxiliary pipeline valve to stop heating the APU compartment, and command the opening of the APU bleed valve to allow the bleed air to enter into the APU.

Preferably, the maximum established temperature threshold is about 4° C.

As shown in FIG. 2, the bleed air heating system may further comprise at least one electrically controlled injection nozzle 12 for injecting the bleed air conducted by the auxiliary pipeline 7 into the APU compartment 2, and wherein the temperature controller 10 is electrically coupled with the injection nozzle 12 and is further configured to regulate the air flow injection rate of the nozzle 12 to maintain the temperature in the APU compartment 2 within the minimum and maximum threshold values. The nozzle provides a better control over the bleed air discharged, and thus a more reliable and safe heating.

According to another preferred embodiment, the bleed air heating system further comprises an air mixer 13 having a first passage 13a to receive the bleed air exiting the auxiliary pipeline 7, a second passage 13b to receive the air contained in the APU compartment 2, and an outlet 13c to drain the mixed air into the APU compartment 2. The air mixer helps to mix the bleed air with the APU compartment air. This provides a more uniform heating of the APU compartment, and also helps the sensor to provide more reliable measures.

Preferentially, the air mixer 13 further comprises a jet pump positioned downstream of the air mixer outlet for receiving and impulsing the mixed air into the APU compartment 2. This pump helps reaching all areas of the APU compartment.

Preferably, the air mixer 13 is adapted for pumping mixed air at constant speed. This way, the APU compartment is uniformly heated, reducing the risk of overheating the APU.

Preferably, the temperature controller 10 is electrically coupled with the air mixer 13, and is further configured to regulate the temperature of the pumped air (mixed of bleed air and APU compartment air). This provides a safer heating, in addition to reducing the risk of overheating of the APU. Preferably, the temperature of the pumped air is regulated so that it does not exceed 200° C.

Preferably, the auxiliary pipeline valve 9 is pneumatically activated by a spring. Preferably, the auxiliary pipeline valve 9 is a pneumatic valve, which is spring loaded towards a closed position, for safety reasons, and that when is electrically commanded it goes to an open position as driven by an electric solenoid.

According to another preferred embodiment, the aircraft 1 further comprises an isolation valve 11, and the temperature controller 10 is coupled to the isolation valve 11 and further configured to command the opening of the isolation valve 11, to allow the bleed air to be conducted from the main engine 6 towards the APU 3, when the sensed temperature falls below a minimum temperature threshold value. Further, the temperature controller 10 is configured to command the closing of the isolation valve 11, to avoid bleed air being driven from the main engine 6 towards the APU 3 when the sensed temperature surpasses a maximum temperature threshold value.

According to another preferred embodiment, the aircraft 1 further comprises an APU compartment fire protection system, wherein the temperature controller 10 is coupled with the APU compartment fire protection system to establish the maximum temperature threshold value. Using information of the fire protection system offers a safe heating, without fire risks.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
a main engine capable of providing a supply of bleed air,
an auxiliary power unit housed within an APU compartment, and having an APU bleed valve configured to control a passage of bleed air into the auxiliary power unit,
an APU bleed air duct connecting the main engine with the auxiliary power unit to provide a bleed air passage,
a bleed air heating system for the APU compartment that comprises:
an auxiliary pipeline tapped to the APU bleed air duct and connected to the APU compartment,
an auxiliary pipeline valve configured to control bleed air discharged from the auxiliary pipeline into the APU compartment,
a temperature sensor placed to sense a temperature of the APU compartment, and
a temperature controller coupled to the temperature sensor to receive a sensed temperature, and configured to establish a heating operation mode when the sensed temperature falls below a minimum temperature threshold value, and a standby operation mode when the sensed temperature surpasses a maximum temperature threshold value,
wherein, when the heating operation mode is established, the temperature controller is configured to:
command a closing of the APU bleed valve for preventing the bleed air from entering into the auxiliary power unit,
activate a bleed air supply of the main engine, and
activate an opening of the auxiliary pipeline valve for conducting bleed air from the main engine towards the APU compartment, to heat said APU compartment, and
wherein, when the standby operation mode is established, the temperature controller is configured to:
deactivate the bleed air supply of the main engine,
activate a closing of the auxiliary pipeline valve to stop heating the APU compartment, and
command an opening of the APU bleed valve to allow the bleed air to enter into the auxiliary power unit.

2. The aircraft according to claim 1, wherein the bleed air heating system further comprises at least one electrically controlled injection nozzle for injecting bleed air conducted by the auxiliary pipeline into the APU compartment, and wherein the temperature controller is electrically coupled with the injection nozzle and is further configured to regulate an air flow injection rate of the injection nozzle to maintain the temperature in the APU compartment within minimum and maximum threshold values.

3. The aircraft according to claim 2, wherein the bleed air heating system further comprises an air mixer having a first passage to receive the bleed air exiting the auxiliary pipeline, a second passage to receive the air contained in the APU compartment, and an outlet to drain the mixed air into the APU compartment.

4. The aircraft according to claim 3, wherein the air mixer further comprises a jet pump positioned downstream of the air mixer outlet for receiving and pumping the mixed air into the APU compartment.

5. The aircraft, according to claim 3, wherein the air mixer is configured to pump mixed air at constant speed.

6. The aircraft according to claim 3, wherein the temperature controller is electrically coupled with the air mixer, and is further configured to regulate the temperature of the pumped air.

7. The aircraft according to claim 1, wherein the auxiliary pipeline valve is pneumatically activated by a spring.

8. The aircraft according to claim 1, further comprising an isolation valve, wherein the temperature controller is coupled to said isolation valve and is configured to command an opening of said isolation valve to allow bleed air to be conducted from the main engine towards the auxiliary power unit when the sensed temperature falls below a minimum temperature threshold value, and a closing of said isolation valve to avoid bleed air being conducted from the main engine towards the auxiliary power unit when the sensed temperature surpasses a maximum temperature threshold value.

9. An aircraft, according to claim 1, further comprising an APU compartment fire protection system, wherein the temperature controller is coupled with said APU compartment fire protection system to establish the maximum temperature threshold value.

* * * * *